United States Patent [19]

Priester

[11] Patent Number: 5,587,429
[45] Date of Patent: Dec. 24, 1996

[54] PROCESSING AID SYSTEM FOR POLYOLEFINS

[75] Inventor: Donnan E. Priester, Greenville, Del.

[73] Assignee: E. I. DuPont de Nemours and Company, Wilmington, Del.

[21] Appl. No.: 416,414

[22] Filed: Apr. 4, 1995

[51] Int. Cl.⁶ ............................................. C08L 71/02
[52] U.S. Cl. .................... 525/187; 524/275; 524/377; 524/502; 524/503; 525/57; 525/60; 525/166; 525/172; 525/185; 525/186; 525/190; 525/194; 525/199
[58] Field of Search ........................ 524/377, 502, 524/503, 275; 525/186, 187, 190, 57, 60, 166, 172, 185, 194, 199

[56] References Cited

U.S. PATENT DOCUMENTS

| | | | |
|---|---|---|---|
| 3,125,547 | 3/1964 | Blatz | 260/45.5 |
| 4,252,969 | 2/1981 | Broering et al. | 524/377 X |
| 4,415,691 | 11/1983 | Allen et al. | 524/377 X |
| 4,855,360 | 8/1989 | Duchesne et al. | 525/187 |
| 4,904,735 | 2/1990 | Chapman, Jr. et al. | 525/199 |
| 4,959,396 | 9/1990 | Yankov et al. | 524/377 X |
| 5,110,860 | 5/1992 | Kotani et al. | 524/377 X |
| 5,206,278 | 4/1993 | Famili et al. | 524/377 |
| 5,266,639 | 11/1993 | Chapman, Jr. et al. | 525/200 |
| 5,298,537 | 3/1994 | Vaidya | 524/377 X |

*Primary Examiner*—Judy M. Reddick

[57] ABSTRACT

A processing aid system composition containing fluoropolymer processing aid, polar-side-group-containing extrusion adjuvant, and poly(oxyalkylene) polymer enhances extrusion of polyolefins.

9 Claims, No Drawings

PROCESSING AID SYSTEM FOR POLYOLEFINS

FIELD OF THE INVENTION

This invention is in the field of processing aids for polyolefins.

BACKGROUND OF THE INVENTION

Fluoropolymers are known to be useful as processing aids when used in low concentration in other polymers to mitigate effects such as melt fracture or high torque that limit rate of extrusion of these host polymers, thereby improving processibility. Polyolefins are a class of host polymers of particular interest.

Blatz in U.S. Pat. No. 3,125,547 discloses the use of fluoropolymers in polyolefins to facilitate extrusion. A general requirement taught by Blatz is that the fluoropolymer must be molten or fluid at the processing temperature $T_p$ of the polyolefin. Various two-component process aids have been identified in attempts to achieve better performance than that provided by the single component or Blatz. For example, Chapman & Priester in U.S. Pat. No. 4,904,735 disclose a synergistic combination of solid and fluid fluoropolymers, e.g., a fluoroelastomer and an unmelted fluoroplastic, to achieve enhanced process aid performance. As a further example, Duchesne & Johnson in U.S. Pat. No. 4,855,360 disclose a combination of a fluorocarbon polymer and a poly(oxyalkylene) polymer to reduce melt defects in extruded hydrocarbon polymer. Also, Priester & Stewart in co-pending U.S. patent application Ser. No. 08/196,740 (1994) disclose polar-side-group-containing extrusion adjuvants that counteract the deleterious effect of certain additives on the effectiveness of fluoropolymer processing aids in polyolefins.

In terms of achieving greater effect at lower concentration of costly fluoropolymer, further improvement in the efficiency of fluoropolymer processing aid systems is desired.

SUMMARY OF THE INVENTION

This invention provides a three-part fluoropolymer processing aid system composition comprising fluoropolymer processing aid, polar-side-group-containing extrusion adjuvant, and poly(oxyalkylene) polymer. The invention also provides an extrusion composition comprising polyolefin and a processing effective amount of the processing aid system.

DETAILED DESCRIPTION OF THE INVENTION

It has been discovered that fluoropolymer processing aid, polar-side-group-containing extrusion adjuvant, and poly(oxyalkylene) polymer together are unexpectedly more effective in enhancing extrusion of polyolefins than is the combination of fluoropolymer processing aid and polar-side-group-containing extrusion adjuvant or the combination of fluoropolymer processing aid and poly(oxyalkylene) polymer at similar total amounts of processing aid system ingredients. The three-component combination of fluoropolymer processing aid, polar-side-group-containing extrusion adjuvant, and poly(oxyalkylene) polymer is herein called "three-part fluoropolymer processing aid system", sometimes "3-FPAS".

The fluoropolymer processing aids that can be used in the practice of this invention include those known in the art and used to mitigate effects such as melt fracture, high extrusion pressure, or high torque that limit rate of extrusion of the host polyolefins, and such as formation of deposits at the die exit and fluctuations in extrusion pressure or extrusion rate. They include the broad class of fluoropolymers that are molten or fluid at the processing temperature of the polyolefin, as taught by Blatz, including fluoroelastomers and fluoroplastics with relatively low melting temperature. Such low-melting fluoroplastics include but are not limited to polyvinylidene fluoride, copolymers of tetrafluoroethylene (TFE) and hexafluoropropylene (HFP) disclosed in U.S. Pat. No. 5,266,639, copolymers of TFE and perfluoro(methyl vinyl) ether, and copolymers of TFE, HFP and vinylidene fluoride ($VF_2$). The fluoropolymer processing aids used in the practice of this invention also include various multi-component processing aid systems, in which at least one fluoropolymer is used in conjunction with other material. Other material can also be fluoropolymer, compositionally different from first fluoropolymer, such as disclosed, for example, by Chapman & Priester. In general, the fluoropolymer processing aids that can be used in this invention have fluorine to carbon ratio of at least 1:2, and preferably at least 1:1. Among the preferred fluoropolymers are the $VF_2$/HFP fluoroelastomers that typically contain 30–70 wt % $VF_2$, 70–30 wt % HFP, and 0–40 wt % TFE.

Preferred polar-side-group-containing extrusion adjuvants that can be used in the practice of this invention contain essentially no fluorine, have at least two carbon atoms not in polar side groups, have at least four polar side groups, and have at least one polar side group for each 100 carbon atoms, preferably 50 carbon atoms, and most preferably 35 carbon atoms that are not in polar side groups. Polar side groups include but are not limited to carboxylic acid, salt of carboxylic acid, ester, hydroxyl, and carbonyl. As an illustration, ethylene diamine tetraacetic acid (EDTA) contains two carbon atoms not in side groups, four carboxylic acid groups (polar side groups), and a ratio of polar side groups to carbon atoms not in side groups of 2. As a further illustration, a copolymer of ethylene and 3 mol % methacrylic acid has 3 polar side groups for each 100 carbon atoms that are not in polar side groups. In a molecule such as EDTA, the polar groups may more properly be pendant groups, but for purposes of this invention are called side groups. More than one polar-side-group-containing extrusion adjuvant can be used, but generally a single adjuvant is used alone.

Compounds that can be used as extrusion adjuvants include EDTA and salts of EDTA. Polar-side-group-containing compounds that can be used also include polymers containing repeat units derived from monomers used in polymerization that introduce polar side groups into the polymer. The side groups can be introduced directly as results when a monomer such as acrylic acid or vinyl acetate is used, or indirectly as results when an incorporated vinyl acetate is hydrolyzed to a vinyl alcohol unit or when the carboxylic acid side group of an incorporated methacrylic acid unit is neutralized with a metal ion, in which case an incorporated polar side group is converted to another polar side group. Polar side groups can also be introduced into a polymer by post-polymerization grafting, such as the grafting of an a,b-unsaturated carboxylic acid or of maleic anhydride onto a polyolefin. The monomers that introduce polar side groups into the polymer can include but are not limited to a,b-unsaturated carbonyl compounds, vinyl esters, and carbon monoxide. Specific examples of monomers that can be used include acrylic acid, methacrylic acid, methyl acrylate, methyl methacrylate, and vinyl acetate, which are preferred.

Polymers containing repeat units derived from monomers that introduce polar side groups into the polymer can be homopolymers of such monomers, copolymers of such monomers with non-polar monomers such as olefins, copolymers of such monomers with one or more other such monomers, or copolymers of such monomers with one or more other such monomer and non-polar monomers. Illustrative polymers include vinyl ester homopolymers, copolymers of olefin and vinyl ester, and copolymers of olefin and a,b-unsaturated $C_3$–$C_8$ carboxylic acid. Specific examples include polyvinylacetate, ethylene/vinyl acetate copolymer, ethylene/acrylic acid copolymer, and ethylene/methacrylic acid copolymer, which are preferred in themselves and as certain derivatives thereof. Preferred derivatives include polyvinyl alcohol, ethylene/vinyl alcohol copolymer, and ionomeric polymers (ionomers) made by at least partially neutralizing the acid moiety of ethylene/acrylic acid copolymer or ethylene/methacrylic acid copolymer by at least one cation such as lithium, sodium, potassiium, magnesium, calcium, barium, lead, tin, zinc, or aluminum. Ionomers are well known in the art; see Rees, U.S. Pat. No. 3,264,272, for example.

Polymeric polar-side-group-containing extrusion adjuvants are preferred, and ionomer resins are most preferred. The molecular weight, or melt viscosity, of such polymeric adjuvants is not critical but such polymers are preferably solid at room temperature.

The polar-side-group-containing extrusion adjuvant should have adequate thermal stability at the extrusion temperature of the polyolefin, so as not to cause adverse effects on the polyolefin such as objectionable discoloration.

It is not required that polar-side-group-containing extrusion adjuvant be compatible with host polyolefin. However, compatibility can be desirable if appearance is critical. It is also desired that adjuvant not exude to the surface of the polyolefin.

The poly(oxyalkylene) polymers useful in this invention can include poly(oxyalkylene) polyols and their derivatives. A useful class of poly(oxyalkylene) polymers can be represented by the general formula $$A[(OR^1)_x OR^2]_y$$

wherein A is an active hydrogen-free residue of a low molecular weight, organic initiator compound having a plurality of active hydrogen atoms (e.g. 2 or 3 ), such as a polyhydroxyalkane or polyether polyol, e.g. ethylene glycol, glycerol, 1,1,1-trimethylol propane, and poly(oxypropylene) glycol; y is 2 or 3; the $(OR^1)_x$ is a poly(oxyalkylene) chain having a plurality of oxyalkylene groups, $(OR^1)$, wherein the $R^1$ radicals can be the same or different, and are selected from the group consisting of $C_1$, to $C_5$ alkylene radicals and preferably $C_2$ or $C_3$ alkylene radicals; and x is the number of oxyalkylene units. Said poly(oxyalkylene) chain can be a homopolymer chain, e.g. poly(oxyethylene) or poly(oxypropylene), or can be a chain of randomly distributed (i.e., a heteric mixture) oxyalkylene groups, e.g. a copolymer of —$OC_2H_4$— and —$OC_3H_6$— units, or can be a chain having alternating blocks or backbone segments of repeating oxyalkylene groups e.g., a polymer comprising —$(OC_2H_4)_a$— and —$(OC_3H_6)_b$— blocks, where a+b is about 5 to about 500 and preferably about 10 to 300. $R^2$ is H or an organic radical such as alkyl, aryl or combination thereof such as aralkyl or alkaryl, and may contain hetero atoms such as O or N. For example, $R^2$ can be methyl, butyl, phenyl, benzyl, and acyl groups such as acetyl ($CH_3CO$—), benzoyl ($C_6H_5CO$—) and stearoyl ($C_{17}H_{35}CO$—).

Representative poly(oxyalkylene) polymer derivatives can include poly(oxyalkylene) polyol derivatives wherein the terminal hydroxy groups have been partly or fully converted to ether derivatives, e.g., methoxy groups, or ester derivatives, e.g. stearate groups, ($C_{17}H_{35}COO$—). Other useful poly(oxyalkylene) derivatives are polyesters, e.g. prepared from dicarboxylic acids and poly(oxyalkylene) glycols. Preferably, the major proportion of the poly(oxyalkylene) polymer derivative by weight will be the repeating oxyalkylene groups, (OR). Said poly(oxyalkylene) polyols and their derivatives can be liquids or solids at room temperature and have a molecular weight of at least 200 and preferably a molecular weight of about 400 to 20,000 or higher, e.g. 200,000 or more.

Poly(oxyalkylene) polyols useful in this invention include those sold under the trademark Carbowax® (Union Carbide), such as Carbowax® 3350, $H(OC_2H_4)_nOH$ wherein n is about 76, and those sold under the trademark Pluronic® (BASF), e.g. Pluronic® F-77, $H(OC_2H_4)_d[OCH(CH_3)CH_2]_e(OC_2H_4)_fH$, wherein d+f is about 108, and e is about 35.

Preferred poly(oxyalkylene) polymers are poly(oxyethylene) glycols, often referred to as polyethylene glycols, having a molecular weight of about 1000 to 20,000.

When the processing aid system of this invention is used in a polyolefin for film applications, the polyolefin generally will have a melt index (ASTM D-1238) of 5.0 or less at 190° C., preferably 2.0 or less. For high-shear melt processing such as fiber extrusion or injection molding, even high-melt-index resins, for example, those having a melt index of 20 or more, may suffer processing difficulties. Such polyolefins may comprise any thermoplastic hydrocarbon polymer obtained by the homopolymerization or copolymerization of one or more monoolefins of the formula $CH_2$=$CHR'$ wherein R' is an alkyl radical, usually of not more than eight carbon atoms. In particular, this invention is applicable to the following: polyethylene, both of the high-density type and the low-density type having densities within the range 0.89–0.97; polypropylene; polybutene-1; poly(3-methylbutene); poly(4-methylpentene); and linear low density copolymers of ethylene and an alpha-olefin, such as propylene, butene-1, hexene-1, octene-1, decene-1, octadecene-1, or n-methylpentene-1.

Because of the different melt characteristics of the olefin polymers mentioned, the addition of fluoropolymer processing aids may be of greater value in some polyolefins than in others. Thus, polyolefins such as polypropylene and branched polyethylene, that have low molecular weight or broad molecular weight distributions and, therefore, have good melt flow characteristics even at low temperature, may require the use of fluoropolymer additives only under unusual, adverse extrusion conditions, in which circumstances these polyolefins are difficultly melt-processible polymers. However, polymers such as high molecular weight, high density polyethylene or linear low density ethylene copolymers, particularly those with narrow or very narrow molecular weight distributions, are normally difficultly melt-processible and addition of fluoropolymers can be especially beneficial.

A composition for extrusion to final product, e.g., film, will commonly contain a major portion of polyolefin and a minor portion of three-part fluoropolymer processing aid system which is effective to provide processing benefit to the polyolefin. While the constituents of the three-part fluoropolymer processing aid system can be present in equal concentration, they will generally be present in different concentrations. Normally, the concentrations of fluoropolymer processing aid and of poly(oxyalkylene) polymer will not exceed 2000 ppm. The polar-side-group-containing adjuvant will normally be present in concentration of less than 2 wt %, preferably no more than 1 wt %, and most preferably no more than 2500 ppm. The amount of minor constituents actually present can vary with the polyolefin, the extrusion conditions, and other factors including additives present in the polyolefin. Optionally, of course, one can use excess adjuvant if it is otherwise acceptable in the composition. However, to obtain the improvement of this invention, it is normally not necessary for adjuvant concentration to exceed 8× poly(oxyalkylene) polymer concentration. Minimum concentration of each constituent of the three-part fluoropolymer processing aid system in an extrusion composition is about 25 ppm. Stated concentrations are based on the combined weight of the four named constituents. Other constituents as known in the art, e.g., antiblock agent, can also be present but are not included in the calculation of concentrations of the named constituents.

An extrusion composition comprising a major portion of polyolefin and a minor portion of fluoropolymer processing aid system may be formulated in numerous ways. For example, the individual constituents as pure compositions can be added to the polyolefin sequentially, simultaneously, or in some combination. One or more or all of the system constituents can be incorporated into a carrier before incorporation into the polyolefin. The system constituents can be in separate carriers, or one or more of the system constituents can be in the same carrier.

It may be advantageous for the fluoropolymer processing aid system to be combined in a processing aid system composition. The processing aid system composition provided by this invention comprises fluoropolymer processing aid, polar-side-group-containing adjuvant, and poly(oxyalkylene) polymer. If adjuvant and poly(oxyalkylene) polymer have suitable rheological properties, the processing aid system can consist essentially of fluoropolymer processing aid, polar-side-group-containing adjuvant, and poly(oxyalkylene) polymer. This might be the case, for example, if the polar-side-group-containing adjuvant is polymeric, such as an EVOH resin, an ethylene/acrylic acid copolymer, an ethylene/methacrylic acid copolymer, or an ionomeric resin. Alternatively, if lower concentration is desired or if the properties of fluoropolymer processing aid, polar-side-group-containing adjuvant, and poly(oxyalkylene) polymer are not suitable for a stand-alone composition, the processing aid system compositon can further comprise a polymeric host. The polymeric host is at least compatible with the polyolefin of the extrusion composition of this invention. In particular, the polymeric host can itself be a polyolefin, either the same as or different from the polyolefin of the extrusion composition.

The concentration ratio of fluoropolymer processing aid, polar-side-group-containing adjuvant, and poly(oxyalkylene) polymer in the three-part fluoropolymer processing aid system composition can vary widely. The constituents can be present in approximately equal weight proportions, or one can be the major component and the others minor components. In general, the ratio by weight of adjuvant to fluoropolymer will be in the range of from about 30/70 to about 95/5, preferably in the range of from about 50/50 to about 5/15, while the ratio of poly(oxyalkylene) polymer to fluoropolymer will be in the range of from about 6/1 to about 1/4, preferably in the range of from about 3/1 to about 1/2. When a polymeric host is used in the processing aid system composition, the amount of polymeric host is usually, but not necessarily, at least equal to the combined amount of fluoropolymer processing aid, polar-side-group-containing adjuvant, and poly(oxyalkylene) polymer, by weight. Polymeric polar-side-group-containing adjuvants are preferred for three-part fluoropolymer processing aid system compositions, especially when the processing aid system composition consists essentially of fluoropolymer processing aid, polar-side-group-containing adjuvant, and poly(oxyalkylene) polymer. For example, a three-part fluoropolymer processing aid system composition might consist of 20 wt % of fluoropolymer, 50 wt % of ionomeric resin and 30 wt % of polyethylene glycol. This formula is illustrative only. The ionomer proportion could be greater or lesser, and the proportion of polyethylene glycol may be less than that of fluoropolymer.

EXAMPLES

The evaluations reported in the following examples employed a C. W. Brabender Instruments, Inc. Computerized Plasti-Corder® equipped with a 19.1 mm (0.75 inch) extruder with a 25/1 length/diameter ratio. The screw had 10 feed flights, 10 compression flights with a 3:1 compression ratio, and 5 metering flights. Operating parameters were controlled by four independent heating zones, two pressure transducers, and a torque measuring drive unit with 1–120 rpm capability. The instrument was equipped with software for rheometric extrusion testing. The extrusion head used for these tests was a horizontal ribbon (tape) die body, supplied by C. W. Brabender, made from #416 ferritic stainless steel and designed to accept die inserts such that the exit width was 2.54 cm (1.0 inch), the land length was 1.016 cm (0.4 inch) and the die gap was a nominal 0.51 mm (0.02 inch). Die inserts used were chrome-plated tool steel. The die inserts were cleaned prior to each evaluation by scrubbing with a Scotchbrite® pad (3M Company) and washing with acetone.

In operation, the required machine conditions were set and the polymer resin was extruded until equilibrium was reached as judged by constant throughput and constant die pressure. For a selected linear low density polyethylene (LLDPE) with a melt index (MI) of 1.0 at 190° C., used throughout as a reference resin, extrusion at 30 rpm at 200° C. measured at the die gave throughput of about 15 g/min and pressure at the die of about 14–21 MPa (2000–3000 psig), depending on the exact die gap. Unless otherwise stated, die temperature was set at 204° C. for the tests summarized below.

A typical experiment was carried out according to the following sequence. The machine was first determined to be clean and operating at standard conditions as judged by performance with reference resin feed. The baseline resin or resin compound was introduced to the machine and allowed to reach equilibrium. The reference resin was sometimes used as the baseline resin, saving a step. Then, the feed was changed to the baseline resin or resin compound containing the processing aid system to be tested and extrusion was continued to equilibrium. Throughput, die pressure and extrudate appearance were recorded were recorded during the time required to reach equilibrium. Times reported below for melt fracture to disappear are for conditioning runs carried out at nominal extruder screw speed of 25 rpm, though slight increase in screw speed was sometimes required to maintain throughput of extrudate containing higher concentration of polyethylene glycol. This was attributed to screw slippage. Equilibrium data were obtained at various throughput rates.

After each series of experiments, the die inserts were removed and the extruder and die body were purged with LLDPE containing 10% silica. Replacement die inserts were installed. After calibration of the transducers, the reference polyolefin resin was run to establish equilibrium conditions and to assure that reliable output was being obtained. I.e., this is the first step in an experiment as recited above. If previously established equilibrium values for the reference polyolefin resin were not achieved, the cleanout procedure was repeated.

Each example reported below consisted of a set of three or four experiments as described above, each using a different processing aid system. The processing aid systems were two three-part fluoropolymer processing aid systems of this invention (3-FPAS-1 and 3-FPAS-2) and two two-part processing aid systems as controls (2-PAS-1 and 2-PAS-2). These had the following descriptions:

3-FPAS-1 was a three-part blend of fluoropolymer processing aid, polar-side-group-containing extrusion adjuvant, and poly(oxyalkylene) polymer. The fluoropolymer processing aid that was a combination, according to the teachings of U.S. Pat. No. 4,904,735, of an elastomeric copolymer of vinylidene fluoride ($VF_2$) and hexafluoropropylene (HFP) having glass transition temperature below test temperature, and a plastic copolymer (FEP) of tetrafluoroethylene (TFE) and HFP having crystalline melting temperature of about 265° C. The adjuvant was sodium-neutralized ionomer resin having MI=2.8 (Surlyn®, grade 8940, DuPont Co.). The poly(oxyalkylene) polymer was polyethylene glycol having molecular weight of 8000 (Carbowax® 8000, Union Carbide). Proportions by weight were 3.2 parts of ionomer and 0.8 part of polyethylene glycol for each part of fluoropolymer processing aid. When the processing aid system was introduced into polyolefin resin at 400 ppm, then, the concentration by weight of the various components was 80 ppm of fluoropolymer processing aid, 256 ppm of polar-side-group-containing adjuvant, and 64 ppm of poly(oxyalkylene) polymer. This processing aid system was introduced into the polyolefin resin as a three-part fluoropolymer processing aid system composition in a polyolefin matrix (LLDPE, MI=1).

3-FPAS-2 was similar to 3-FPAS-1, except that the proportions by weight were 3 parts of ionomer and 1 part of polyethylene glycol for each part of fluoropolymer processing aid.

2-PAS-1 was a two-part blend of the fluoropolymer processing aid and the polar-side-group-containing adjuvant of 3-FPAS-1. Proportions by weight were 4 parts of ionomer for each part of fluoropolymer processing aid. When 2-PAS-1 was introduced into polyolefin resin at 400 ppm, then, the concentration by weight of the various components was 80 ppm of fluoropolymer processing aid and 320 ppm of polar-side-group-containing adjuvant. This processing aid system was introduced as a blend prepared by extrusion compounding.

2-PAS-2 was a two-part powder blend of fluoropolymer processing aid and poly(oxyalkylene) polymer (Dynamar® FX-5920, 3M Company) that is believed to fall within the scope of U.S. Pat. No. 4,855,360. The processing aid is a $VF_2$/HFP fluoroelastomer and the poly(oxyalkylene) polymer is polyethylene glycol. Proportions by weight are about 2.2 parts of polyethylene glycol for each part of fluoropolymer processing aid. These ingredients are blended with a small amount of talc, so that when 2-PAS-2 was introduced into polyolefin resin at 400 ppm, the concentration by weight of the various components was 120 ppm of fluoropolymer processing aid and 267 ppm of polyethylene glycol.

Compositions for extrusion testing according to the general procedure recited above were prepared by combining all components in a large polyethylene bag and shaking vigorously.

Example 1

The polyolefin resin used was GRSN 7047, an LLDPE with MI=1.0 in granular form (Union Carbide Corp.). Added were 5000 ppm of Super Floss® silica (Manville Sales Corp.) antiblock agent, using an appropriate amount of a 20 wt % masterbatch in low density polyethylene with MI=9.0 (masterbatch from Ampacet Corp.), and 1000 ppm of erucamide slip agent. All four of the processing aid (PA) systems described above were tested at concentrations of 800 ppm. Results are summarized in Table 1, wherein the time given is the time to disappearance of melt fracture during conditioning, and the pressure given is the die pressure for equilibrium throughput of 20 g/min. As shown by the data, the three-part fluoropolymer processing aid systems provided the fastest conditioning and the lowest die pressure, even though fluoropolymer concentration is as low as for one of the two-part systems and lower than for the other.

TABLE 1

Results for Example 1

| PA System | Conditioning Time (min) | Die Pressure (Psig) | Die Pressure (MPa) |
|---|---|---|---|
| None | — | 2950 | 20.3 |
| 3-FPAS-1 | 13 | 1550 | 10.7 |
| 3-FPAS-2 | 15 | 1500 | 10.3 |
| 2-PAS-1 | 32 | 2200 | 15.2 |
| 2-PAS-2 | 21 | 2100 | 14.5 |

Example 2

The polyolefin resin was an LLDPE with MI=1.0 and known to contain an acid scavenger in a proprietary formulation (Dowlex® 2045, Dow Chemical Co.). Processing aid systems tested were 3-FPAS-1 and the two two-part systems, each at a concentration of 400 ppm. Times to the vanishing of melt fracture during conditioning were 42 min for 3-FPAS-1, 115 min for 2-PAS-1, and 100 min for 2-PAS-2, showing a substantial advantage for the three-part fluoropolymer processing aid system of this invention.

I claim:

1. A process comprising extruding a composition comprising polyolefin and an effective amount of a processing aid system comprising fluoropolymer processing aid, ionomer, and poly(oxyalkylene) polymer, said fluoropolymer processing aid consisting essentially of hexafluoropropylene/vinylidene fluoride elastomeric copolymer.

2. An extrusion composition comprising a major portion of polyolefin and a minor portion of fluoropolymer processing aid system, said system comprising fluoropolymer processing aid, ionomer, and poly(oxyalkylene) polymer, said fluoropolymer processing aid consisting essentially of hexafluoropropylene/vinylidene fluoride elastomeric copolymer.

3. The extrusion composition of claim 2, wherein said poly(oxyalkylene) polymer is polyethylene glycol.

4. The extrusion composition of claim 2, wherein the concentration of ionomer is less than 2 wt % based on the combined weight of said polyolefin, said fluoropolymer processing aid, said ionomer and said poly polymer.

5. The extrusion composition of claim 2, wherein the concentration of ionomer is 25 ppm to 1 wt % based on the combined weight of said polyolefin, said fluoropolymer processing aid, said ionomer and said poly polymer.

6. Processing aid system composition comprising fluoropolymer processing aid, ionomer, and poly(oxyalkylene) polymer, said flouropolymer processing aid consisting essentially of hexafluoropropylene/vinylidene fluoride elastomeric copolymer.

7. The processing aid system composition of claim 6, further comprising polyolefin host resin.

8. The processing aid system composition of claim 6, wherein the ratio of ionomer to fluoropolymer processing aid is in the range of from about 30/70 to about 95/5 by weight.

9. The processing aid system composition of claim 6, wherein the ratio of poly(oxyalkylene) polymer to fluoropolymer processing aid is in the range of from about 6/1 to about 1/4 by weight.

* * * * *